Oct. 5, 1954  R. N. JANEWAY  2,690,818
SNUBBER UNIT
Filed Feb. 20, 1950  3 Sheets-Sheet 1
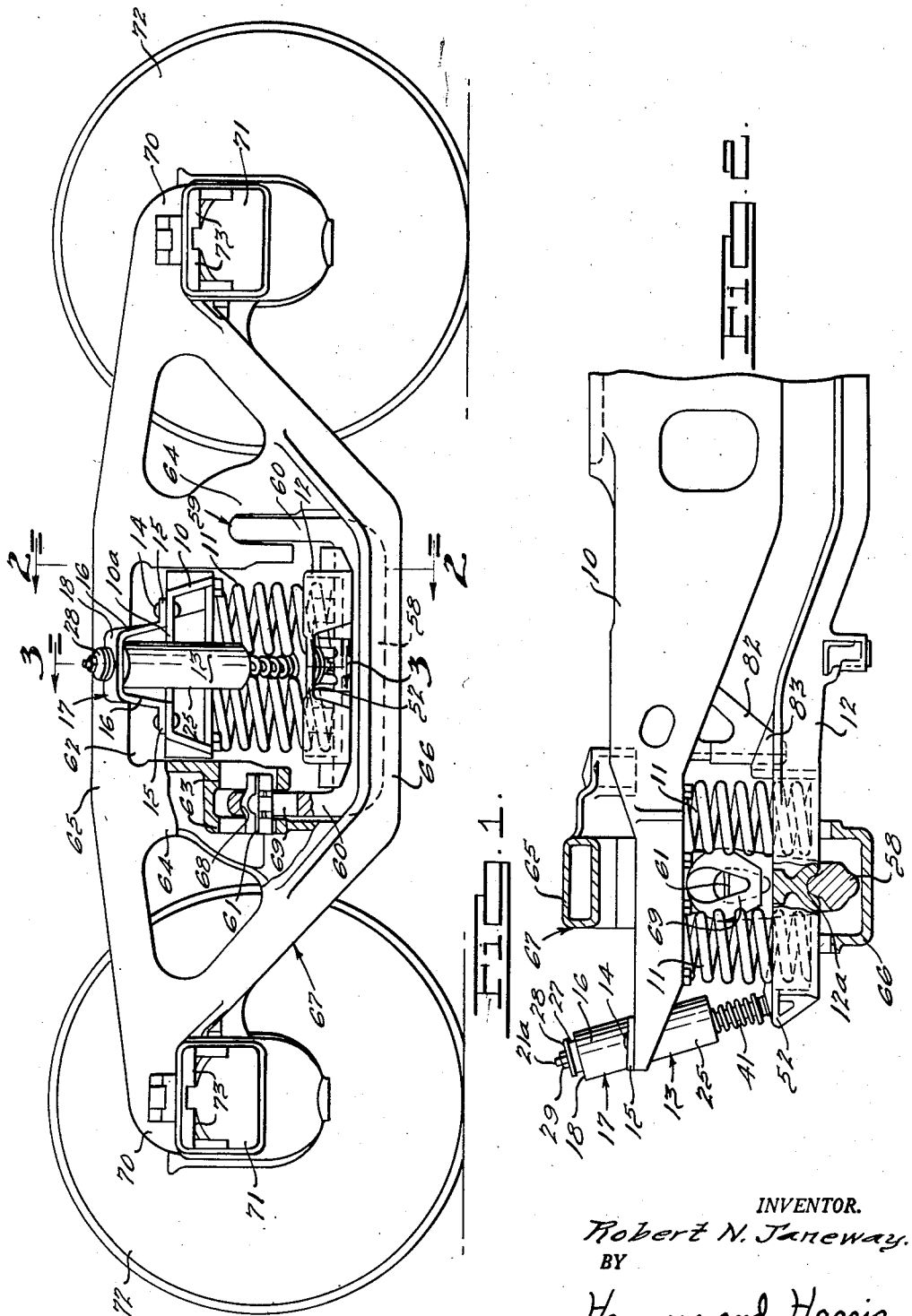
INVENTOR.
Robert N. Janeway.
BY
Harness and Harris
ATTORNEYS.

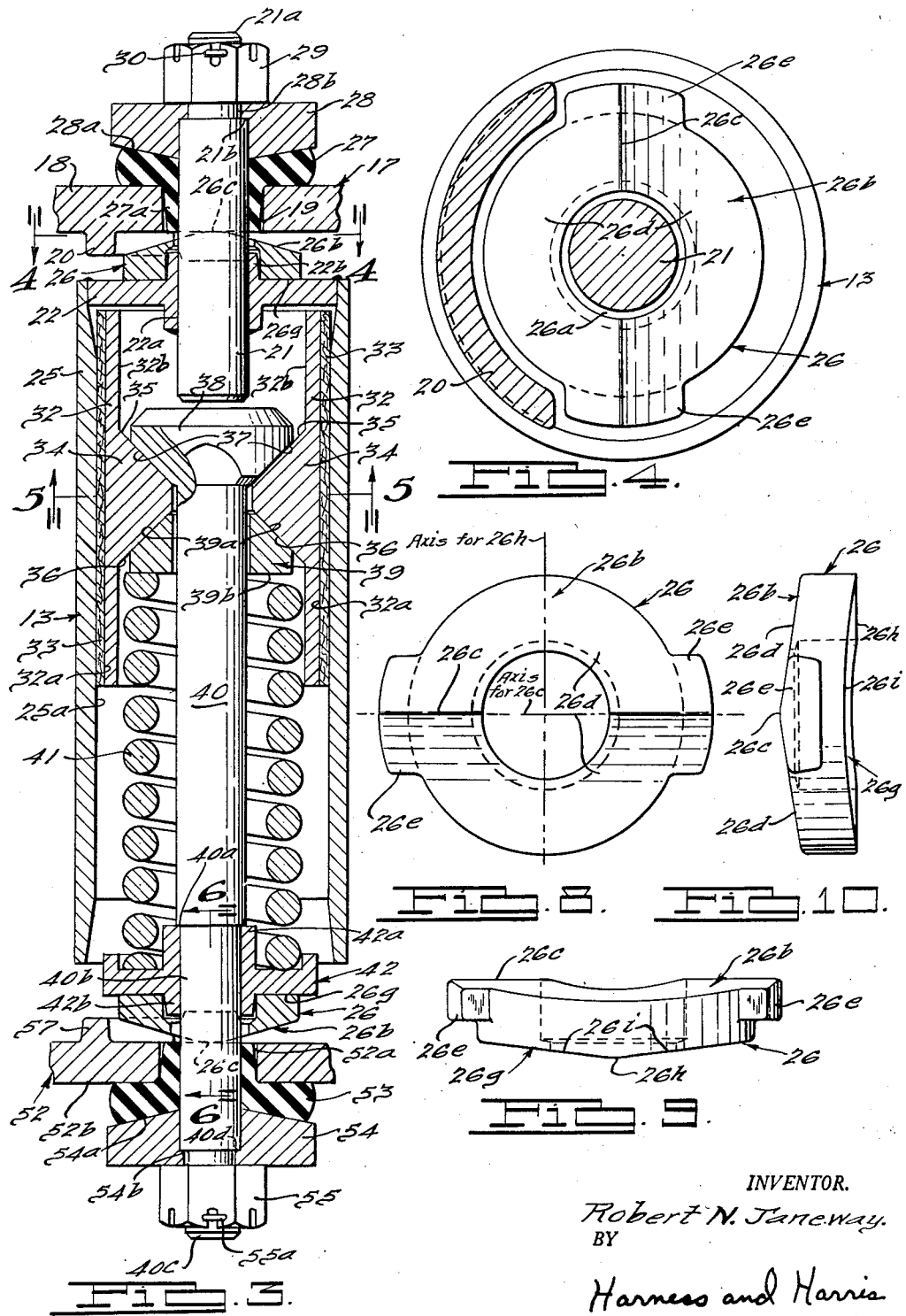

Oct. 5, 1954 — R. N. JANEWAY — 2,690,818
SNUBBER UNIT
Filed Feb. 20, 1950 — 3 Sheets-Sheet 3
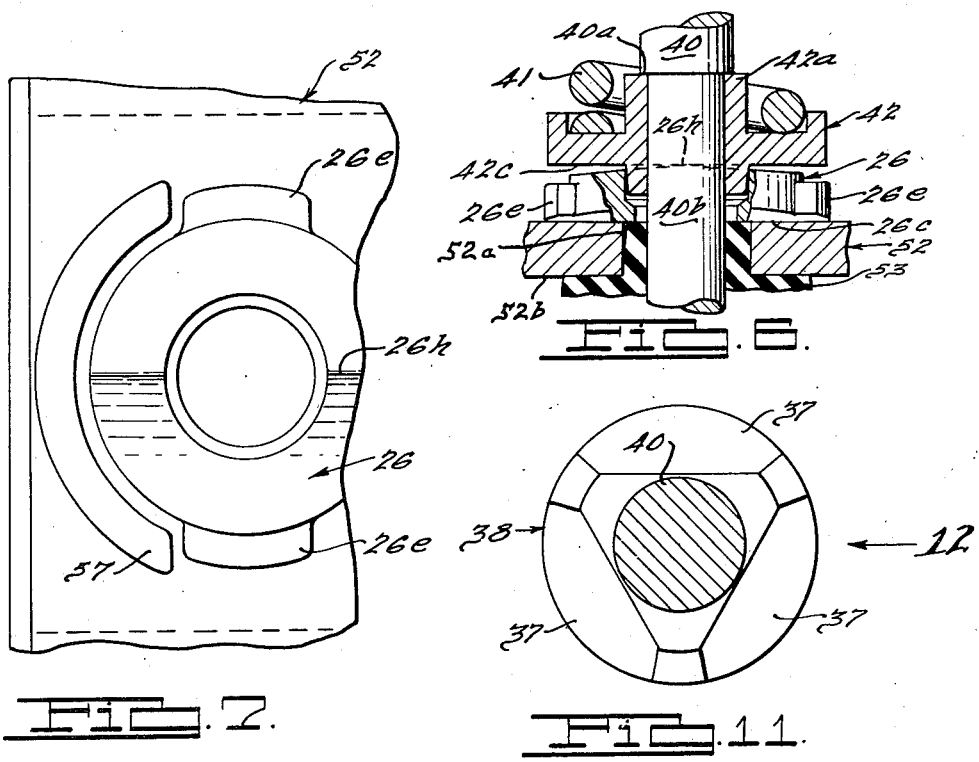
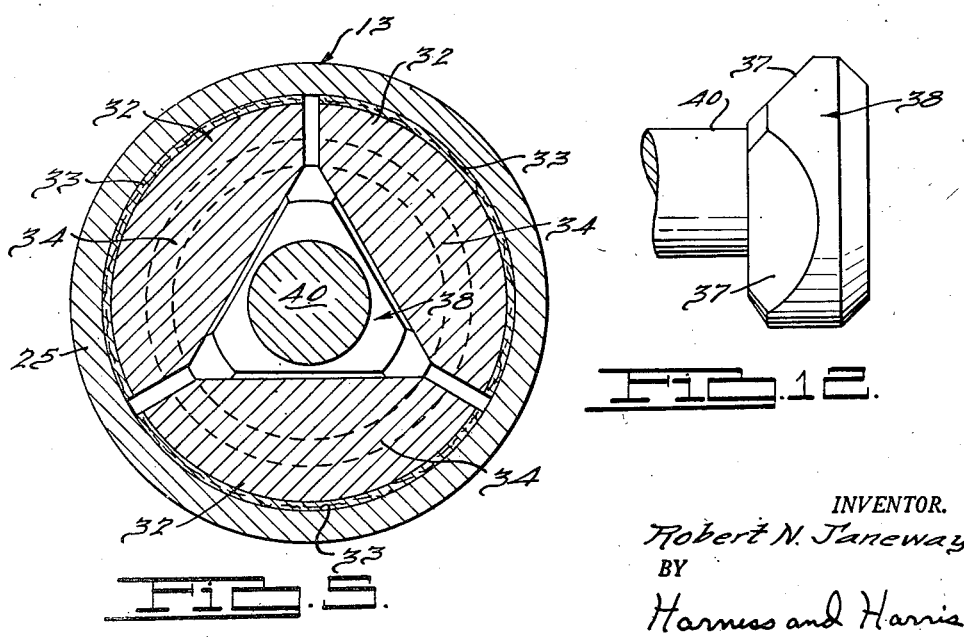
INVENTOR.
Robert N. Janeway.
BY
Harness and Harris
ATTORNEYS.

Patented Oct. 5, 1954

2,690,818

UNITED STATES PATENT OFFICE 2,690,818

SNUBBER UNIT

Robert N. Janeway, Detroit, Mich., assignor to Chrysler Corporation, Highland Park, Mich., a corporation of Delaware Application February 20, 1950, Serial No. 145,185

12 Claims. (Cl. 188—129)

This invention relates to a vibration damping means or friction type snubber unit. More specifically it relates to a snubber unit particularly adapted for connection between a pair of relatively movable elements of a railway car truck or the like. This invention is an improvement on the structure disclosed in the application of Robert N. Janeway et al. for an End Connection for Energy Absorbers, Serial No. 16,234, filed March 22, 1948, now U. S. Patent No. 2,574,788.

It is a primary object of this invention to provide a snubber unit that is extremely efficient in operation, exceptionally rugged in design, of a relatively simple construction that is economical to manufacture, assemble, and install, and of such a size and shape that it requires a minimum of space and is therefore usable in the maximum number of installations requiring a device of this type.

It is a further object of this invention to provide a highly efficient snubber unit that is designed as a self-contained unit so that it may be readily attached between any pair of relatively movable members. Accordingly, this unit does not require that the relatively movable members be formed with integral or detachable cooperating snubber friction parts such as are required with many of the currently used snubber units.

It is an additional object of this invention to provide a snubber unit of this type having the minimum number of separate parts and one that is adapted to be assembled by the simplest and easiest methods.

It is still another object of this invention to provide a snubber unit in which the several elements thereof are designed for the maximum durability and strength as well as the utmost simplicity in manufacture and assembly.

Other objects and advantages of this invention will be apparent from the following disclosure and a consideration of the related drawing wherein:

Fig. 1 is a side view of a railroad truck, with certain parts broken away and shown in section, the truck including a snubber unit embodying this invention connected between the bolster and spring plank members;

Fig. 2 is a fragmentary transverse view partially in section of the railroad truck of Fig. 1, the view being taken along the line 2—2 of Fig. 1;

Fig. 3 is a sectional view taken on the line 3—3 of Fig. 1 showing the snubber unit and its end connections according to the present invention;

Fig. 4 is a sectional view taken on the line 4—4 of Fig. 3;

Fig. 5 is a sectional view taken on the line 5—5 of Fig. 3;

Fig. 6 is a sectional view taken on the line 6—6 of Fig. 3;

Fig. 7 is a plan view of an end portion of the spring plank to which one end of the snubber unit is connected, portions of the associated rocker block being shown connected thereto;

Figs. 8, 9 and 10 are plan, front, and side views, respectively, of a rocker block part used in each end connection between the snubber unit and the relatively movable frame members connected by the snubber unit; and Figs. 11 and 12 are plan and end views of the wedge ring element formed on the inner end of the plunger rod that recipocates within the snubber unit barrel or cylinder.

Figs. 1 and 2 of the drawing show a more or less specialized type of railway car truck comprising a side frame 67 rigidly supported at each end on a pair of longitudinally spaced wheel axle journal box assemblies 71. The central portion of the side frame 67 is formed with a pair of spaced, vertically extending columns 64 that define a window-like opening 62 which is adapted to receive the end portions of the transversely extending, relatively movable, car bolster 10 and spring plank 12. The car bolster 10 is supported on the plank 12 by the sets of coil springs 11.

The plank 12 has a transverse groove 12a on its lower side, as shown in Fig. 2, receiving a base 58 of a U-shaped swing hanger 59 which has spaced legs 60. The swing hanger legs 60 are pivotally mounted on pivot pins 61 having wedge-shaped end portions fitting in correspondingly shaped openings formed in portions 63 of the columns 64. Columns 64 connect the upper compression part 65 and the lower tension part 66 of the side frame 67. The lower tension part 66 is U-shaped in cross section and partially houses the swing-hanger base 58. The central portion of each pivot pin 61 has an upper curved surface 68 upon which rests a mating, correspondingly curved surface that forms a wall portion of an opening 69 in the end of each swing hanger leg 60.

The side frame 67 has a bearing portion 70 on each end that receives a journal box 71 that is mounted on each end of an axle, not shown. The axles mount the wheels 72. The bearing portions 70 of the side frame member 67 engage the journal boxes 71 at their tops at a level indicated by the numeral 73, which is seen to be above the pivot axis of the swing hanger 59 on the pivot pins 61. Thus the forces that may be transmitted to the side member 67 by the swing hanger 59 will not tend to tilt the side member in such a way as to make it unstable. Unsquaring of the side members 67 is controlled or resisted by the plank 12, the swing hangers 59, the side frame carried mounting pins 61 and the connections therebetween.

Figs. 1 and 2 show only one end of the bolster 10 and the plank 12 and one swing hanger 59 and one side frame 67, but it will be understood that there is another side frame 67 carrying a swing hanger 59 that supports the other end of the plank 12 which in turn supports the other end of the bolster 10 through a set of springs 11 similar to the four coil springs 11 shown in Figs. 1 and 2.

In actual operation of the railroad truck illustrated, the bolster 10 may move up or down, i. e., toward and away from the plank 12. The swing hangers 59 may pivot about the pins 61 as axes, causing the swing hanger bases 58 and the plank 12 to move transversely of the truck. Thus there may be some movement of the plank 12 with respect to the bolster 10 transversely of the truck or, viewed in another way, longitudinally of the plank and the bolster. Coil springs 11 offer some resistance to this relative longitudinal movement between plank and bolster, but such movement may take place to the extent permitted by the projection 82 depending from bolster 10 and the upstanding flanged projection 83 on plank 12. As shown in Fig. 2, projection 82 extends into projection 83 and there is a slight space between portions of the projections that will contact after a small amount of movement of the plank 12 to the right with respect to the bolster 10. After such contact, further movement to the right of the plank 12 will produce movement to the right of the bolster 10. Likewise the projections 82 and 83 permit a small amount of movement of the bolster 10 to the left with respect to the plank 12 and thereafter conjoint movement to the left of the bolster and the plank. It is to be understood that there are corresponding projections 82 and 83 on the right end of bolster and plank 12 which portions are not shown. These projections will permit movement to the left of the plank 12 with respect to the bolster 10 in a similar amount and thereafter conjoint movement to the left of bolster and plank. Likewise they will permit movement to the right of the bolster 10 with respect to the plank 12 and thereafter conjoint movement to the right.

To control the relative movement between the bolster 10 and plank 12 in a vertical plane, as well as in other planes, a snubber unit 13 is connected between the superimposed end portions of the bolster and plank. The end of the bolster 10 is recessed as designated at 10a, and to the recessed end of the bolster 10 are fastened by rivets 14, flanges 15 formed on the ends of the legs 16 of a U-shaped bracket 17 having a base portion 18 positioned above the level of the bolster 10. Bracket 17 supports the upper end of snubber 13.

The bracket base 18 (see Fig. 3) is provided with an opening 19 and a depending, semi-circular projection 20, the purpose of which will hereafter become readily apparent. Through the opening 19 extends a stem or rod-like formation 21 that is integral with and forms an end portion of snubber 13. Rod 21 has a reduced threaded outer end 21a for a purpose that will become readily apparent. The rod 21 also extends through an opening 22a in the snubber cap member 22. This cap member 22 is fixed to the cylinder or barrel 25 of snubber 13 by welding or the like and is designed to close one end of the barrel 25.

The cap member 22 has a sleeve-like projection 22b that seats an annular rocker block 26, which latter element has a bore 26a (see Fig. 4) therethrough that fits loosely on the stem 21. The rocker 26 has an upper rocking surface 26b in engagement with the lower side of the bracket base 18 at the opening 19. The upper surface 26b has a mid portion 26c as viewed in Fig. 3, which is curved on an axis perpendicular to the plane of the drawing. The other portions 26d of the upper surface are formed as a pair of planes slightly angled to one another and to the lower side of the bracket base 18. Figs. 4 and 7–10 show the general outer shape of the rocker 26 to be circular except at the upper side 26b where there are rectangular extensions 26e that project beyond the outer circular outline. Fig. 4 shows that the extensions 26e are adapted to engage the projections 20 on the bracket base 18 on any appreciable angular movement of the rocker 26 about the axis of the rod 21. Extensions 26e thus limit rotation of the rocker block 26 about the rod 21.

The rocker 26 has a lower rocking surface 26g in engagement with the exposed upper surface of the cap member 22. The lower surface 26g of rocker 26, as indicated in Fig. 9, has a mid portion 26h curved on an axis perpendicular to the plane of the drawing in Fig. 9. The lower surface 26g has other portions 26i, which are formed by a pair of planes slightly angled to one another. The axis for mid portion 26h of lower surface 26g is perpendicular to and is rotated 90 degrees with respect to the axis for said portion 26c of upper surface 26b. This may be clearly seen in Fig. 8 in which both axes are designated. On the outer side of the bracket base 18 is a resilient ring 27, formed of a suitable material such as rubber, surrounding the stem 21. Ring 27 has an axially extending sleeve 27a that projects into the bore 19 in bracket portion 18. The resilient ring 27 is compressed against the bracket base 18 by a washer 28 held in place by a nut 29 engageable with the threaded end 21a of rod 21. A cotter pin 30 holds the nut 29 against undesired angular movement on the rod 21. The washer 28 has a conical surface 28a in engagement with resilient ring 27, whereby the compression of the ring is high at the inner periphery of the resilient ring and low at its outer periphery and thus too high a stress in the outer periphery is avoided, which stress would otherwise be set up when the rod 21 is tilted out of a perpendicular position with respect to the bracket base 18. Compression of the resilient ring 27 is limited or predetermined by engagement of a reduced portion 28b on the inner periphery of the washer 28 with a shoulder 21b formed inwardly of the reduced threaded end 21a of the rod 21.

Positioned within the snubber cylinder 25 are three segmental, shell-like, friction shoes 32 (see Figs. 3 and 5) which shoes are preferably formed of metal. Shoes 32 have bonded to their outer surfaces 32a suitable friction facings 33 which are adapted to be forced into engagement with the interior surface 25a of the cylinder 25. These friction facings 33 may be of non-metallic material such as conventional clutch or brake lining material. Each shoe 32 has a wedge portion 34 with opposed flat, inclined, converging, surfaces 35 and 36 projecting from the inner cylindrical surface 32b thereof. The surfaces 35 are engaged with the three flat, inclined, surfaces 37 formed on the enlarged end 38 of the plunger rod 40. Flat, inclined, wedging surfaces 39a, on a wedge ring 39 that is concentrically mounted around the plunger rod 40, are adapted to engage the shoe wedge surfaces 36. The flat end 39b of the wedge ring 39 is engaged by one end of a precompressed coil spring 41 that is also concentrically mounted about the rod 40. The other end of the coil spring 41 is engaged by the spring retaining collar 42 which has a sleeve portion 42a that seats against the shoulder 40a formed on the lower end of plunger rod 40. Spring collar 42 is pressed on the reduced lower end portions 40b of rod 40 so as to be more or less permanently attached to the rod 40. In assembly of the snubber the spring collar is merely forced along the rod end portions 40b until the inner end of sleeve 42a seats against the rod shoulder 40a. In pressing the spring collar 42 into position the spring 41 is compressed a predetermined amount to insure proper functioning of the snubber wedging elements 34, 38, 39. By pressing the spring collar 42 on the rod 40 instead of connecting the collar to the rod by a nut threaded on the rod end portion 40b a simplified and more rugged construction is provided that greatly facilitates assembly and reduces the cost of the snubber unit. By eliminating use of a threaded connection of the spring collar 42 to rod 40 the stength of the lower end of the rod is increased without increasing the size of the rod or associated parts.

A lower rocker block 26, like the upper rocker block 26 that engages the bracket base 18, is mounted on the lower end of rod 40 in engagement with the outer side of the retaining ring 42. This lower rocker block 26 fits loosely around the sleeve portion 42b of spring collar 42. Collar 42b is received in a recess in the rocker block 26. The lower rocker 26 has a rocking surface 26g with a curved mid portion 26h (Fig. 6) in rocking engagement with the exposed face 42c of the spring collar 42. The curved mid portion 26h has an axis of curvature that lies in the plane of the drawing in Fig. 3 and that is perpendicular to the drawing plane in Fig. 4. The lower rocker 26 also has a rocking surface 26b with a curved mid portion 26c in rocking engagement with the upper side of a sloping end portion 52 formed on the end of the plank 12. The axis of the curved mid portion 26c is perpendicular to the plane of the drawing in Fig. 3. A semi-circular projection 57 on the plank portion 52 receives the rectangular extensions 26e on the lower rocker 26 in the manner illustrated for the upper rocker 26 and the projection 20 on the bracket base 18. Any appreciable angular movement of the lower rocker 26 about the rod 40 as an axis is prevented by the projection 57 which is arranged to engage the extensions 26e on the lower rocker block 26.

The reduced end 40b of plunger rod 40 extends through an opening 52a in the plank end portion 52. A resilient ring 53, which may be formed of rubber or other suitable material is positioned on the rod end portion 40b in a manner whereby its body portion will be pressed into engagement with the lower side 52b of the plank portion 52. The resilient ring 53 is held compressed against the plank portion 52 by a washer 54 retained on the rod end 40b by a nut 55 engaging the threaded portion 40c at the lower end of the rod 40. A cotter pin 55a holds the nut 55 against rotational movement. The washer 54 has a conical surface 54a in engagement with the resilient ring 53 so that the compression thereof is high at the inner or central regions and low at the outer periphery, whereby the ring 53 will not be too highly stressed at its outer periphery when the rod 40 is tilted angularly from its substantially perpendicular, normal position with respect to the plank portion 52. The washer 54 has an internal shoulder 54b at its inner portion adapted to be pressed into engagement with the shoulder 40d or rod end 40b and thus the position of the washer 54 is relatively fixed with respect to rod end 40b so that the precompression of the resilient ring 53 is fixed or predetermined when nut 55 is threaded on rod end 40c.

The snubber barrel 25, the friction shoes 32 and the associated parts constitute an energy absorber that acts between the bolster 10 and the plank 12. In Fig. 3 the snubber or energy absorber 13 is shown collapsed or compressed to its minimum length. This represents a condition that would never be achieved in actual service for the springs 11 of the truck would become solid before this condition could be attained. It will be noted that under such a condition of loading the friction shoes 32 extend almost to the upper end of the barrel 25, and the enlarged end 38 on the rod 40 very nearly abuts the inner end of the stem or rod 21. Figs. 1 and 2 show the relative positions of the bolster 10 and plank 12 and snubber 13 under a light truck bolster loading. The degree to which the coil spring 41 extends beyond the lower end of the barrel 25 indicates the degree to which the bolster supporting springs 11 are loaded. In Figs. 1 and 2 the snubber or energy absorber 13 is relatively extended in length.

As previously stated, upper and lower rockers 26 each have rocking surface portions 26c and 26h with rocking axes transverse to one another. Because of the transverse relation of the axes of the rocking surface portions, the rockers in effect provide universal rocking freedom in the connections of the snubber unit 13 to the bolster bracket 18 and the plank end portion 52.

The rockers 26 are prevented from rotating, because during operation of the railway truck the relative horizontal movement between bolster 10 and plank 12 longitudinally of bolster and plank (transversely of the truck) is appreciable and definitely greater than relative horizontal movement between bolster and plank transversely of the bolster and plank (longitudinally of the truck). Thus, in Fig. 3, the aforesaid greater relative movement means shifting of the bolster bracket 18 to left or right in the plane of the drawing with respect to the plank portion 52. Such relative shifting in the plane of the drawing involves pivoting about the axes of the surface portions 26c of the upper and lower rockers 26, since these axes are transverse to the plane of the drawing. Since these axes are also individually nearer the resilient rings 27 and 53 than are the axes of surface portions 26h, the pinching of the rings 27 and 53 for a given amount of relative movement of bolster and plank in the plane of the drawing is less than it would be if the pivoting took place about the axes of surface portions 26h. The semi-circular projections 20 and 57 on bolster bracket 18 and plank portion 52, respectively, and the rocker block extensions 26e prevent rotation of the rockers and thereby maintain the axes of surface portions 26c of the rockers transverse to the plane of the drawing, as shown in Fig. 3.

The precompressed coil spring 41 on the rod 40 acts through the inclined surfaces 35, 36, 37 and 39a on the wedge portions 34 of the shoes 32 and the engaged rod end 38 and wedge ring 39 to urge the friction surfaces 33 of the shoes 32 outwardly against the interior surface 25a of the snubber barrel or cylinder 25 with a substantially constant force. Because of frictional engagement of the facings 33 on the shoes 32 with the interior surface 25a of the cylinder 25, movement of the cylinder 25 in a longitudinal or axial direction with respect to the friction shoes 32 is resisted by a force proportional to the force with which the precompressed spring 41 urges the shoes 32 outwardly against the cylinder 25. As each of the resilient rings 27 and 53 is precompressed by the washers 28 and 54 and the nuts 29 and 55 by a force greater than that required to effect longitudinal movement of the cylinder 25 with respect to the shoes 32, the arrangement herein disclosed insures that all vibration damping or energy absorption will be accomplished by the frictionally engaged surfaces 25a, 33. The precompressed rubber rings 27 and 53 act as substantially rigid elements during relative axial movement of the cylinder 25 with respect to the shoes 32. Accordingly, there is no possible tendency for the rings 27 and 53 to set up or increase the vibratory movement between the spring connected bolster 10 and plank 12, as would be the case with conventional resilient snubber end connections that are usually arranged such that they are flexed axially during movement of the barrel 25 relative to the shoes 32. Thus when forces are applied to the bolster 10 tending to move the bolster 10 and its bracket 17 upwardly away from the plank 12 there will be no material deformation of the resilient rings 27 and 53, because the force required for movement of the cylinder 25 with respect to the segmental shoes 32 is less than the force of precompression of the rings 27 and 53, and consequently there will be relative movement between the shoes 32 and the cylinder 25 before further compression and deformation of rings 27 and 53 can take place. If forces are applied to the bolster 10 to move the bracket 17 and the bolster 10 downwardly towards the plank 12, there can be no relative longitudinal or axial movement of the end connections of the shock absorber 13 with respect to the bolster bracket 17 and the plank 12, because the rockers 26a rest solidly against the bolster bracket 17 and plank portion 52, respectively. Relative movement between the bolster bracket 17 and the plank portion 52 in directions transverse of the rod 40, i. e., lengthwise of bolster and plank and transversely thereof, may take place by virtue of the curved surface portions 26c and 26h, transverse to one another, on the rockers 26a. It is thought to be obvious that, if the ends of the snubber 13 were respectively connected by conventional means to the plank 12 and bolster 10, i. e., by resilient means such as springs or rubber blocks arranged to resiliently resist movement in both axial directions, vibrations would be developed and transmitted by such resilient means without relative displacement of the energy-absorbing elements 25, 32 of the snubber unit.

While the rings 27 and 53 are precompressed to a predetermined degree so as to act as substantially rigid elements in the transmission of forces axially of the snubber unit 13, still, these rings 27 and 53 are so designed and arranged with respect to the snubber end connections that the rigid rocker blocks 26 will provide a freely pivoting universal connection between the snubber unit and the relatively movable, snubber connected, sprung, frame members 10 and 12. The dual function of the precompressed resilient rings 27 and 53, while rigidly transmitting axial movement and also permitting free pivotal movement, is a basic distinction between the construction herein disclosed and the prior art.

In the assembly of the snubber unit 13, the shoes 32 are mounted about the plunger rod 40 in the relative positions corresponding to those shown in Fig. 3 and then the concentrically arranged shoe and rod unit is inserted into the bore in cylinder 25 through the lower open end thereof. Wedge ring 39 is then mounted around rod 40 and thereafter the spring 41 is mounted around the rod 40 so that its inner end bears against the end surface 39b of wedge ring 39. The next step in the assembly of the snubber unit is the compression of the spring 41 so that the wedge ring 39 will continuously urge the shoes 32 radially outward into frictional engagement with the inner surface 25a of cylinder 25 with a substantially constant damping force. This compression of spring 41 is accomplished by pressing the spring retaining collar 42 on the reduced end portion 40b of plunger rod 40. The degree of compression of spring 41 is limited by the engagement of the inner end of collar sleeve 42a with the shoulder 40a on the rod 40 during compression of spring 41, and only then, does rod end 38 engage the stem 21. The relatively fixed connection of collar 42 to rod 40 provides a reaction point for the compressed spring 41 so that spring 41 will continuously urge the shoes 32 radially outwardly with a substantially constant frictional engaging force between shoes 32 and cylinder 25. This engaging force between the shoes 32 and cylinder 25 is calculated for the prescribed loading or spring deflection rate to be carried by the springs 11 and bolster 10 and it remains substantially constant for all relative axial positions of the shoes 32 and cylinder 25 due to the fact that the spring 41, when once assembled in the cylinder 25, does not become lengthened or shortened by different truck loadings, that is by relative movement between barrel 25 and shoes 32. Variable truck loadings do not vary the force applied to the wedge ring 39. The reasons spring 41 does not vary in length during relative movement between members 10 and 12 is that the loading of spring 41, during installation of the retaining collar 42 on rod 40, is such that the bolster supporting springs 11 will become solid before the load applied to the snubber 13 becomes sufficiently large to overcome the precompression of the spring 41.

Another point to be noted in this snubber arrangement is that once the collar 42 has been mounted on the rod 40 so that spring 41 is compressed the required amount, and the snubber unit 13 thereafter assembled between the relatively movable frame members 10 and 12, thereafter it is immaterial whether the relatively fixed connection between the rod 40 and collar 42 is maintained for the mounting of the snubber unit 13 in its supporting framework will maintain the required degree of compression of the spring 41. This point is of importance from a service standpoint for even though the pressed fit between collar 42 and rod 40 might be loosened after long, hard, continuous service, still, the loosening of this connection has no effect whatever on the operation of this snubber unit once it is properly installed in the supporting framework. It is obvious that a pinned connection can be used between collar 42 and rod 40 to positively maintain the fixed connection between these members but such a connection is more expensive and unnecessary in the construction herein disclosed. As previously pointed out the resilient rings 27 and 53 are compressed to such a degree that all damping of the vibratory movement between members 10 and 12 will be absorbed by the relative axial movement between cylinder 25 and shoes 32. This insures that the rod 40 and spring 41 remain relatively fixed once they are installed and that the rings 27 and 53 are not subjected to axial deformation during damping by the snubber 13. Consequently rings 27 and 53 cannot set up vibrations during transmission of the axially directed forces between sprung members 10 and 12.

While I have shown the snubber unit 13 applied to a particular type of railway truck, still, it is obvious that its application is not limited to any particular type of railway truck and that it may be applied between any pair of relatively movable, sprung members. The claims appended are intended to cover all applications of the principles of this invention and are not limited to the specific application herein disclosed.

I claim:

1. A friction snubber adapted to be connected between a pair of relatively movable members comprising a hollow cylinder, a plurality of friction shoes axially movably mounted within said cylinder, each shoe having an outer arcuately shaped surface adapted to engage portions of the inner arcuately shaped surface of the cylinder, the inner surface of said shoes each having a pair of relatively inclined wedging surfaces projecting therefrom, a plunger rod extending into the cylinder through an open end thereof, said rod having an enlarged inner end portion formed with wedging surfaces adapted to engage one of the inclined wedging surfaces on each friction shoe, a shoulder on the plunger rod adjacent the outer end thereof, a wedge ring encircling the plunger rod having wedging surfaces arranged for engagement with the other wedging surface on each friction shoe, a coil spring encircling the plunger rod with one end in abutting engagement with the wedging ring, a spring retaining collar pressed on the plunger rod in abutting engagement with the other end of the coil spring and seated on the shoulder of the outer end of the plunger rod, said collar being arranged so as to precompress said spring and cause said spring to directly transmit force from the collar to said other wedging surface, said shoulder preventing axial movement of the spring retaining collar along the plunger rod from the outer end towards the inner end thereof so that the precompression of the spring remains unchanged during load variation, means mounted on the outer end of the plunger rod and seated on the spring retaining collar to pivotally mount one end of the snubber on a first supporting member, and means fixedly connected to the other end of the snubber unit to provide for the pivotal connection of said other end of the snubber unit to a second supporting member.

2. A friction snubber adapted to be connected between a pair of relatively movable members comprising a hollow cylinder, a plurality of friction shoes movably mounted within said cylinder, each shoe having an outer arcuately shaped surface adapted to engage portions of the inner arcuately shaped surface of the cylinder, the inner surface of said shoes each having a pair of relatively inclined wedging surfaces projecting therefrom, a plunger rod extending into the cylinder through an open end thereof, said rod having an enlarged inner end portion formed with wedging surfaces adapted to engage one of the inclined wedging surfaces on each friction shoe, a shoulder on the plunger rod adjacent the outer end thereof, a wedge ring encircling the plunger rod having wedging surfaces arranged for engagement with the other wedging surface on each friction shoe, a coil spring encircling the plunger rod with one end in abutting engagement with the wedging ring, a spring retaining collar pressed on the plunger rod in abutting engagement with the other end of the coil spring and seated on the shoulder on the outer end of the plunger rod, said collar being arranged so as to precompress said spring and cause said spring to directly transmit force from the collar to said other wedging surface, said shoulder preventing axial movement of the spring retaining collar along the plunger rod from the outer end towards the inner end thereof so that the precompression of the spring remains unchanged during load variation, means mounted on the outer end of the plunger rod and seated on the spring retaining collar to pivotally mount one end of the snubber on a first supporting member, and means fixedly connected to the other end of the snubber unit to provide for the pivotal connection of said other end of the snubber unit to a second supporting member, said last mentioned means including portions engageable with the enlarged inner end of said plunger rod to limit movement of said plunger rod in one direction axially of the cylinder.

3. A friction snubber adapted to be connected between a pair of relatively movable members comprising a hollow cylinder, a plurality of friction shoes movably mounted within said cylinder, each shoe having an outer arcuately shaped surface adapted to engage portions of the inner arcuately shaped surface of the cylinder, the inner surface of said shoes each having a pair of relatively inclined wedging surfaces projecting therefrom, a plunger rod extending into the cylinder through an open end thereof, said rod having an enlarged inner end portion formed with wedging surfaces adapted to engage one of the inclined wedging surfaces on each friction shoe, a shoulder on the plunger rod adjacent the outer end thereof, a wedge ring encircling the plunger rod having wedging surfaces arranged for engagement with the other wedging surface on each friction shoe, a coil spring encircling the plunger rod with one end in abutting engagement with the wedging ring, and a spring retaining collar pressed on the plunger rod in abutting engagement with the other end of the coil spring and seated on the shoulder on the outer end of the plunger rod, said collar being arranged so as to precompress said spring and cause said spring to directly transmit force from the collar to said other wedging surface, said shoulder preventing axial movement of the spring retaining collar along the plunger rod from the outer end towards the inner end thereof so that the precompression of the spring remains unchanged during load variation.

4. A friction snubber adapted to be connected between a pair of relatively movable members comprising a hollow cylinder with a closed end and an open end, an axially extending stem projecting through and fixed to said closed end, a plurality of friction shoes mounted within said cylinder for axial movement relative thereto, each shoe having a first arcuately curved surface adapted to frictionally engage portions of the inner arcuately shaped surface of the cylinder and a second surface portion with a pair of wedging surfaces projecting therefrom, a plunger rod extending into the cylinder through the open end thereof, said plunger rod having an enlarged inner end portion formed with wedging surfaces adapted to engage one of the wedging surfaces on each friction shoe, a shoulder on the plunger rod spaced axially from the inner end thereof, a wedge ring encircling the plunger rod having surfaces arranged for engagement with the other wedging surfaces on each friction shoe, resilient means encircling the plunger rod with one end thereof in abutting engagement with the wedging ring, and a collar pressed on the plunger rod in abutting engagement with the other end of the resilient means and seated against the shoulder on the plunger rod, said collar being arranged so as to precompress said spring and cause said spring to directly transmit force from the collar to said other wedging surface, said shoulder preventing axial movement of the collar along the plunger rod from the outer end toward the inner end thereof so that the precompression of the spring remains unchanged during load variation.

5. A friction snubber adapted to be connected between a pair of relatively movable members comprising a hollow cylinder with a closed end and an open end, an axially extending stem projecting through and fixed to said closed end, a plurality of friction shoes mounted within said cylinder for axial movement relative thereto, each shoe having a first arcuately curved surface adapted to frictionally engage portions of the inner arcuately shaped surface of the cylinder and a second surface portion with a pair of wedging surfaces projecting therefrom, a plunger rod extending into the cylinder through the open end thereof, said plunger rod having an enlarged inner end portion formed with wedging surfaces adapted to engage one of the wedging surfaces on each friction shoe, a shoulder on the plunger rod spaced axially from the inner end thereof, a wedge ring encircling the plunger rod having wedging surfaces arranged for engagement with the other wedging surface on each friction shoe, resilient means encircling the plunger rod with one end thereof in abutting engagement with the wedging ring, a collar pressed on the plunger rod in abutting engagement with the other end of the resilient means and seated against the shoulder on the plunger rod, said collar being arranged so as to precompress said spring and cause said spring to directly transmit force from the collar to said other wedging surface, said shoulder preventing axial movement of the collar along the plunger rod from the outer end towards the inner end thereof so that the precompression of the spring remains unchanged dring load variation.

6. A shock absorber comprising a hollow cylinder provided with a closed and an open end, a plurality of friction shoes each formed with a segment of a cylindrical surface extending axially thereof and arranged to engage the inside surface of the cylinder, said shoes each having two sets of opposed, inclined, radially extending, wedging surfaces formed thereon, a plunger rod having one end thereof extending into the cylinder through the open end thereof and having a preformed, enlarged portion with radially extending wedging surfaces generally near said one end of the rod engageable with one of the sets of wedging surfaces on said shoes, said rod having a shoulder formed thereon generally near the other end of the rod, a wedge ring mounted on the rod and positioned in engagement with the other set of wedging surfaces on the segmental shoes, a compression type coil spring mounted on the rod with one end in engagement with the wedge ring, and a plate-like retaining ring having a rod receiving sleeve fixedly mounted on the rod in engagement with the shoulder on said other end of the rod means carried by the said other end of the rod adapted to connect said rod to a supporting member so as to permit universal pivotal movement of the shock absorber relative to a supporting member, and stem means extending axially of the cylinder piercing the closed end thereof adapted to connect the other end of the cylinder to a supporting member, said last-mentioned stem means having an axially extending portion located within the cylinder adapted to engage and limit movement of said plunger rod in one axial direction, and means carried by the portion of the stem without the cylinder adapted to connect said stem to a supporting member so as to permit universal pivotal movement of said shock absorber relative to another supporting member.

7. A self contained friction snubber comprising a hollow cylinder provided with a closed end and an open end, a plurality of friction shoes mounted concentrically within said cylinder with each shoe being formed with a segment of a cylindrical surface extending axially of the cylinder and arranged to engage the inside surface of the cylinder, said shoes each having two opposed, diverging, radially extending, wedging surfaces formed thereon, a plunger rod having one end thereof extending into the cylinder through the open end thereof and extending concentrically within said shoes, said one end of said rod having a portion with radially extending wedging surfaces engageable with one of the wedging surfaces on each of said shoes, a wedge ring mounted concentrically about the rod and positioned within the cylinder in abutting engagement with the other wedging surface of each of the segmental shoes, an axially extending resilient element mounted concentrically about the rod with one end portion in abutting engagement with the wedge ring, and a plate-like retaining ring having a rod receiving anchor portion fixedly mounted on the rod at a position spaced axially from said shoes, said retaining ring being positioned so as to engage the other end of said resilient element and compress same against said wedge ring whereby said friction shoes are continuously forced into engagement with said cylinder inner surface with a substantially constant force, means carried by the said other end of the rod adapted to pivotally connect said rod to a first supporting member, and means at the exterior of the closed end of the cylinder to provide means to pivotally connect the closed end of the cylinder to a second supporting member, said closed end of the cylinder having an axially extending portion located within the cylinder adapted to engage and limit axial movement of said one end of said plunger rod in one axial direction.

8. A self-contained friction snubber adapted to be connected between a pair of relatively movable members comprising a hollow cylinder having a first end and a second end, a plurality of friction shoes concentrically mounted within said cylinder for engagement with and movement relative to the inner surface thereof, each shoe having an outer arcuately shaped surface adapted to frictionally engage portions of the inner arcuately shaped surface of the cylinder, the inner surface of said shoes each having a pair of radially directed, relatively inclined, wedging surfaces projecting inwardly therefrom, a plunger rod having one end portion thereof extending into the cylinder through the first end thereof, said rod having a portion at said one end thereof formed with wedging surfaces adapted to engage one of the inclined wedging surfaces on each friction shoe, a wedge ring encircling the plunger rod and located within said cylinder having wedging surfaces arranged for engagement with the other wedging surface on each friction shoe, an axially extending coil spring encircling the plunger rod with one end in abutting engagement with the wedging ring, a spring retaining collar mounted on the plunger rod in abutting engagement with the other end of the coil spring and spaced axially from said shoes, said collar being positioned so as to compress said spring against said wedge ring whereby said friction shoes are continuously forced into engagement with said cylinder inner surface with a substantially constant force, means on the other end of said rod to provide for connection of said rod to one of the relatively movable members and means on the second end of said cylinder to provide for connection of the cylinder to the other relatively movable member.

9. A self-contained friction snubber adapted to be connected between a pair of relatively movable members comprising a hollow cylinder with a first and second end, a plurality of friction shoes concentrically mounted within said cylinder for engagement with and movement relative to the inner surface thereof, each shoe having an outer arcuately shaped surface adapted to frictionally engage portions of the inner arcuately shaped surface of the cylinder, the inner surface of said shoes each having a pair of radially directed, relatively inclined, wedging surfaces projecting inwardly therefrom, a plunger rod having one end portion thereof extending into the cylinder through the first end thereof, said rod having a portion at said one end thereof formed with wedging surfaces adapted to engage one of the inclined wedging surfaces on each friction shoe, a wedge ring encircling the plunger rod and located within said cylinder having wedging surfaces arranged for engagement with the other wedging surface on each friction shoe, an axially extending coil spring encircling the plunger rod with one end in abutting engagement with the wedging ring, a spring retaining collar mounted on the plunger rod in abutting engagement with the other end of the coil spring and spaced axially from said shoes, said collar being positioned so as to compress said spring against said wedge ring whereby said friction shoes are continuously forced into engagement with said cylinder inner surface with a substantially constant force, means on the other end of said rod to provide for connection of said rod to one of the relatively movable members and means on the second end of said cylinder to provide for connection of the cylinder to the other relatively movable member, said cylinder at the second end thereof having means within the cylinder adapted to engage said one end of said plunger rod to limit axial movement of said rod within said cylinder in one direction.

10. A self-contained friction snubber adapted to be connected between a pair of relatively movable members comprising a hollow cylinder, a plurality of friction shoes concentrically mounted within said cylinder, each shoe having an outer arcuately shaped surface adapted to engage portions of the inner arcuately shaped surface of the cylinder, the inner surface of said shoes each having a pair of relatively inclined, radially directed, wedging surfaces projecting therefrom, a plunger rod having one end thereof extending into the cylinder through an open end thereof and arranged concentrically within the friction shoes, said rod having an enlarged portion on said one end thereof formed with inclined wedging surfaces adapted to engage one of the inclined wedging surfaces on each friction shoe, a shoulder on the plunger rod adjacent the other end thereof, a wedge ring encircling the plunger rod and arranged within said cylinder having inclined wedging surfaces in abutting engagement with the other wedging surface on each friction shoe, a coil spring encircling the plunger rod and positioned with one end in abutting engagement with the wedging ring and extending from said wedge ring towards the other end of said rod, a spring retaining collar mounted on the plunger rod and positioned in abutting engagement with the other end of the coil spring and arranged so as to compress said spring against said wedge ring, said shoulder on said rod preventing axial movement of the spring retaining collar along the plunger rod in one axial direction, means mounted on the outer end of the plunger rod to pivotally connect one end of the snubber to a first supporting member, and means connected to the other end of the snubber unit to provide for the pivotal connection of said other end of the snubber unit to a second supporting member.

11. A self-contained friction snubber adapted to be connected between a pair of relatively movable members comprising a hollow cylinder, a plurality of friction shoes concentrically mounted within said cylinder, each shoe having an outer arcuately shaped surface adapted to engage portions of the inner arcuately shaped surface of the cylinder, the inner surface of said shoes each having a pair of relatively inclined, radially directed, wedging surfaces projecting therefrom, a plunger rod having one end thereof extending into the cylinder through an open end thereof and arranged concentrically within the friction shoes, said rod having an enlarged portion on said one end thereof formed with inclined wedging surfaces adapted to engage one of the inclined wedging surfaces on each friction shoe, a shoulder on the plunger rod adjacent the other end thereof, a wedge ring encircling the plunger rod and arranged within said cylinder having inclined wedging surfaces in abutting engagement with the other wedging surface on each friction shoe, a coil spring encircling the plunger rod and positioned with one end in abutting engagement with the wedging ring and extending from said wedge ring towards the other end of said rod, a spring retaining collar mounted on the plunger rod and positioned in abutting engagement with the other end of the coil spring and arranged so as to compress said spring against said wedge ring, said shoulder on said rod preventing axial movement of the spring retaining collar along the plunger rod in one axial direction, means mounted on the outer end of the plunger rod to pivotally connect one end of the snubber to a first supporting member, and means connected to the other end of the snubber unit to provide for the pivotal connection of said other end of the snubber unit to a second supporting member, said other end of the snubber unit having portions arranged interiorly of the cylinder adapted to engage said one end of the plunger rod to limit axial movement of the plunger rod towards said other end of the snubber unit.

12. A self-contained friction snubber adapted to be connected between a pair of relatively movable members comprising a hollow casing having a first end and a second end, a plurality of friction shoes mounted within said casing for engagement with and movement relative to the inner surface thereof, each shoe having an outer surface adapted to frictionally engage portions of the inner surface of the casing, the inner surface of said shoes each having a pair of relatively inclined, wedging surfaces projecting inwardly therefrom, a plunger rod having one end portion thereof extending into the casing through the first end thereof, said rod having a portion at said one end thereof formed with wedging surfaces adapted to engage one of the inclined wedging surfaces on each friction shoe, a wedge ring encircling the plunger rod and located within said casing having wedging surfaces arranged for engagement with the other wedging surface on each friction shoe, an axially extending coil spring encircling the plunger rod with one end in abutting engagement with the wedging ring, a spring retainer means mounted on the plunger rod in abutting engagement with the other end of the coil spring and spaced axially from said shoes, said spring retaining means being positioned so as to compress said spring against said wedge ring whereby said friction shoes are continuously forced into engagement with said casing inner surface with a substantially constant force, means on the other end of said rod to provide for connection of said rod to one of the relatively movable members and means on the second end of said casing to provide for connection of the casing to the other relatively movable member.

References Cited in the file of this patent

UNITED STATES PATENTS

| Number | Name | Date |
|---|---|---|
| 1,370,596 | Kurtz | Mar. 8, 1921 |
| 2,429,140 | Snyder | Oct. 14, 1947 |
| 2,434,287 | Pflager | Jan. 13, 1948 |
| 2,574,788 | Janeway et al. | Nov. 13, 1951 |

FOREIGN PATENTS

| Number | Country | Date |
|---|---|---|
| 734,266 | France | Oct. 19, 1932 |